Dec. 21, 1965  A. NEVULIS  3,224,343
FLUID POWER SYSTEM AND VALVE MECHANISM THEREFOR
Filed Aug. 27, 1963  2 Sheets-Sheet 1

INVENTOR.
ANTHONY NEVULIS
BY
Teare, Tetzn & Teare
ATTORNEYS

Dec. 21, 1965 A. NEVULIS 3,224,343
FLUID POWER SYSTEM AND VALVE MECHANISM THEREFOR
Filed Aug. 27, 1963
2 Sheets-Sheet 2

INVENTOR.
ANTHONY NEVULIS
BY
Teare, Tetzer & Teare
ATTORNEYS

3,224,343
FLUID POWER SYSTEM AND VALVE MECHANISM THEREFOR

Anthony Nevulis, Wickliffe, Ohio, assignor to The Ohio Brass Co., Mansfield, Ohio, a corporation of New Jersey
Filed Aug. 27, 1963, Ser. No. 304,894
14 Claims. (Cl. 91—436)

This invention relates in general to fluid power systems, and more particularly to a valve mechanism for use in a fluid power system, for providing a regenerative circuit therefor.

This system is adapted for use, for instance, in loading or excavating mechanism, wherein a fluid powered, reciprocal type motor unit or units, or the like, actuate a scoop or bucket, for digging or shifting material. With the regenerative circuit arrangement of the instant invention, the fluid or oil being forced from the piston rod side of the motor unit during actuation of the latter, can be returned to the piston side of the motor unit, for aiding in actuating the piston of the motor unit, so that the pump of the system need supply only that amount of pressurized fluid sufficient to compensate for the volume displacement of the piston rod.

Accordingly, an object of the invention is to provide a novel fluid power system for operating a mechanism.

Another object of the invention is to provide a fluid power system which incorporates a regenerative feature therein.

A still further object of the invention is to provide a novel control valve for a fluid power system, which may be attached close to a reciprocal type motor unit in the system, for controlling the application of actuating fluid to the motor unit.

A still further object of the invention is to provide a valve of the latter mentioned type which is effective to control the application of the pressurized fluid to one side of a reciprocal type fluid powered motor unit, while permitting flow of the fluid back to reservoir from the opposite side of the motor unit, but which upon actuation of the motor unit in the opposite axial direction causes the fluid on said one side of the motor unit to be applied to the opposite side thereof, for aiding in actuating the piston of the motor unit.

A still further object of the invention is to provide a novel control valve for providing a regenerative feature to a fluid power system, and wherein the control valve is of simplified and compact construction, for materially facilitating the controlled application of pressurized fluid to an associated motor unit.

Other objects and advantages of the invention will be apparent from the following description taken in conjunction with the accompanying drawings, wherein.

Figure 3:
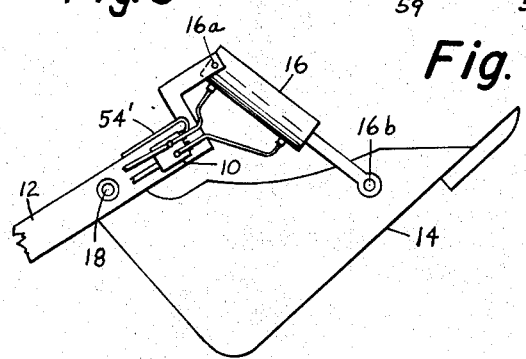
FIG. 3 is a fragmentary, diagrammatic view of a possible arrangement of one of the valves of the system on one type of boom of a loading or excavating bucket equipped machine, for controlling an associated reciprocal type motor unit which is adapted to actuate the bucket.

Referring now again to the drawings, and in particular to FIG. 3 thereof, there is shown a valve member 10 which may be mounted adjacent the outer end of a preferably vertically swingable boom 12, which may represent the boom of a loading or excavating tractor or machine, with the boom pivotally mounting a bucket 14 thereon, and with reciprocal, hydraulic powered, double acting motor unit 16 operating between the boom 12 and the bucket 14, for actuating the latter about its pivot point 18. As can be seen, the reciprocal motor unit 16 may be pivotally coupled as at 16a to the bottom, and pivotally coupled as at 16b to the bucket 14.

The valve member 10 with which the present invention is especially concerned, may be mounted in close proximity to the reciprocal motor unit 16, and as for instance on the boom frame 12, with the valve member 10 being adapted to receive pressurized actuating fluid, such as for instance pressurized oil, via conventional distributing valve member 22 (FIG. 1) which in turn may receive pressurized fluid from a reservoir and pump as utilized in conventional fluid power systems.

The distributing valve 22 may be of the manually operated type, including a control handle 22a operatively coupled to a spool 22b and which upon axial movement of the spool in the conventional manner, determines which of the ports 24, 24a of the distributing valve is pressurized, one of the ports 24, 24a being coupled to the source of pressurized fluid, while the other port is coupled back to the reservoir. Valve 22 may be of the conventional open center type.

Valve 10 may comprise a body portion 28 having ports 30, 30a and 30b therein. Associated with each of the ports is a respective check valve assembly 32, 32a and 32b. Check valve assembly 32 comprises plunger-like valve body 34 resiliently urged, for instance by a compression spring 36, into engagement with a valve seat 38. Body 34 is apertured as at 34a. Accordingly, valve 34 controls the application of fluid pressure from chamber 40 in valve body 28 to transverse passageway 42 in the valve body. Adjustment screw 43 is preferably provided, including threaded adjusting portion 43a and plunger portion 43b, coacting with one another by ball and groove connection 43c. Adjustment of threaded portion 43a inwardly or downwardly from the position shown in FIG. 1 would prevent valve member 34 from closing engagement with seat 38, thus providing for dumping at various degrees of regeneration, as will be hereinafter discussed in greater detail.

Port 30a which communicates with passageway 42, is connected as by means of fluid transmission line 44 to one end of the reciprocal motor unit 16, the other end of the motor unit being connected by fluid transmission line 45 to port 30b of valve 10. The plunger valve 46 of valve assembly 32a is biased as by means of spring 46a, into engagement with a valve seat 46b which separates port 30a from passageway 48 in the valve body 28, which latter passageway connects check valve assemblies 32a and 32b. An opening 49 is provided in plunger valve 46 communicating the interior of the latter with passageway 48. It will be seen that the engagement of the spring biased plunger valve member 50 of check valve assembly 32b with its associated valve seat 52, separates passageway 48 from port 30b. Valve member 50 has no opening corresponding to opening 49 in member 46. Threaded cap members 53, 53a of valve assemblies 32a, 32b are provided, with cap member 53a being vented as at 54. Vent 54 is coupled by line 54' back to line 55 extending between port 24 in valve 22 and port 30 in valve 10, and for a purpose to be hereinafter described.

Figure 1:
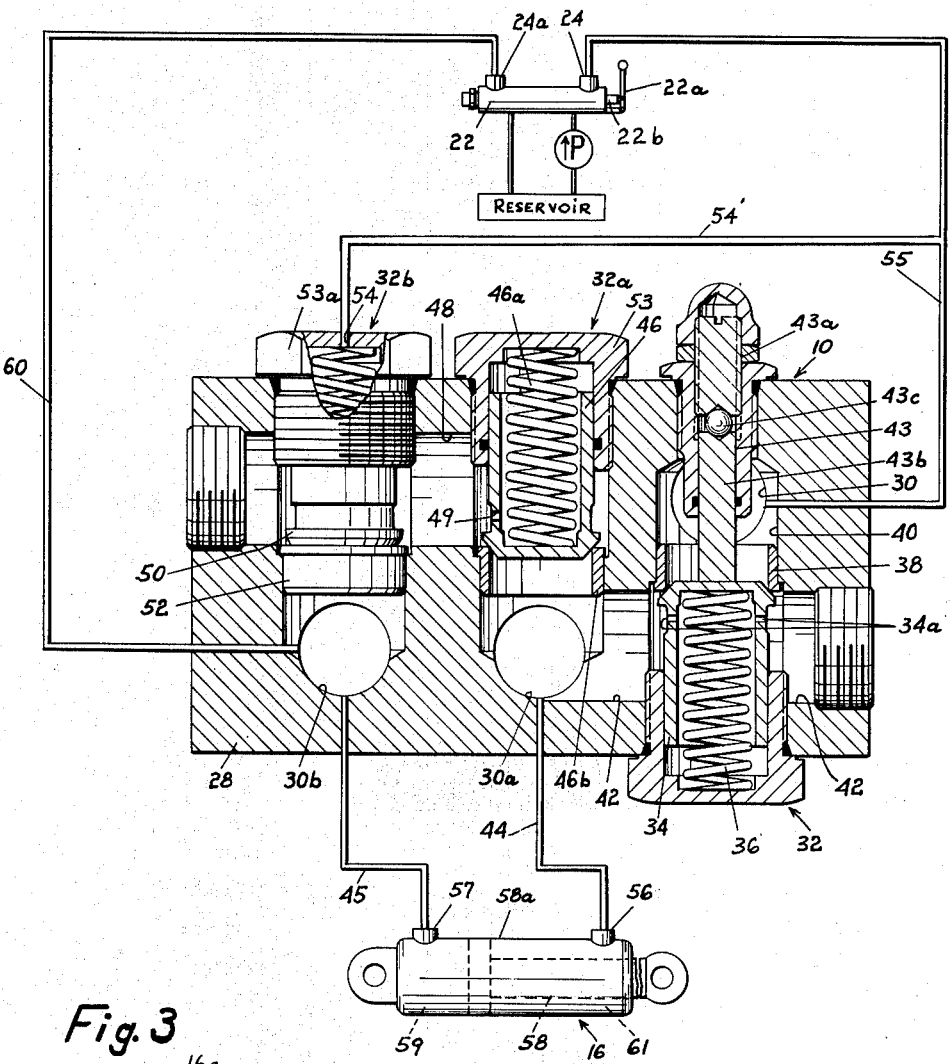
FIG. 1 is a sectioned, generally diagrammatic view of a system embodying the instant invention, and one which may be effectively used for operating a bucket or scoop of a loading or excavating machine.

Operation of the system illustrated in FIG. 1 to tip back the bucket member 14 to the position illustrated for instance in FIG. 3 may be as follows:

The spool 22b of distributing valve 22 is moved axially or actuated, so that the port 24 of the distributing valve 22 is connected to the pressurized source of fluid, thus pressurizing port 30 of valve member 10 via line 55, while port 24a of valve 22 is connected back to the reservoir in the system. Pressurizing port 30 causes application of the pressurized fluid to movable valve member 34, thereby forcing the latter downwardly against the resistance to compression of spring 36, and permitting pressurized fluid to enter the passageway 42, and thence to port 30a and fluid transmission line 44, to port 56 of the reciprocal motor unit 16, thereby driving the piston and associated piston rod 58 inwardly with respect to the cylinder or housing part 58a of the motor unit, and causing the bucket to tip back or pivot upwardly (as viewed in FIG. 3) about its pivot point 18.

Pressurizing the piston rod side or end of the cylinder 58a will also cause check valve 32a to be actuated, thereby opening the valve member 46 thereof, or forcing it upwardly away from its valve seat 46b permitting pressurized fluid to enter passageway 48. However, pressurized fluid flowing in the passageway 48 will not actuate or open check valve assembly 32b, and on the contrary urges valve 50 thereof to closed position. In addition, the pressure acting through line 54' from line 55 positively urges valve 50 to a closed position. Therefore, such pressurized fluid in passageway 48 cannot return to the reservoir tank. However, pressurized fluid on the other side (59) of piston 58, can return to the reservoir via motor port 57, fluid transmission line 45, port 30b and line 60, and thence to port 24a of the distributing valve 22 which is connected to the reservoir as aforementioned.

Now to dump the bucket member 14, the spool of the distributing valve 22 may be shifted axially in the opposite direction, such that port 24a of the distributing valve is pressurized, and port 24 is connected back to the reservoir. Pressurizing port 24a supplies fluid pressure to port 30b of the control valve 10 via line 60 to cause check valve assembly 32b to open and also supplies pressurized fluid to distributing line 45 and port 57 of the motor unit 16, thereby driving the piston and associated piston rod 58 of the motor unit outwardly to cause dumping of the bucket 14. In other words, the bucket swings downwardly (with reference to FIG. 3) about its pivot 18. The fluid on the piston rod side 61 of the motor unit 16 is moved by the piston via motor port 56, line 44, and port 30a, to passageway 42 in the valve member 10. However, assuming that the threaded adjusting screw mechanism 43 is such that the valve member 34 is seated on its valve seat 38, the pressurized fluid cannot return to the tank or reservoir via line 55 due to this check valve assembly 32. However, the pressure will cause valve member 46 of check valve assembly 32a to move off of its valve seat 46b and since the valve member 50 of check valve mechanism 32b is also off of its seat member 52 as aforementioned, the oil from the piston rod side 61 of the motor unit 16 is moved via passageway 48 back via fluid transmission lines 45 and port 57, into the piston side 59 of the motor unit. Accordingly, the pump in the system need supply only a volume of pressurized fluid generally equal to the rod displacement of the motor unit, or units, whatever the case may be. It will be seen that by adjusting screw mechanism 43 downwardly to prevent seating of valve member 34, varying degrees of regeneration are possible.

Should the load in the bucket 14 try to exceed the oil or fluid input of the motor unit, the pressure at port 30b and thus at check valve mechanism 32b will fall, and the valve member 50 will tend to close, thereby restricting the exhaust of pressurized fluid from the piston rod side 61, and thus prevent cavitation effects in the motor unit.

If the control valve 22 is in neutral position (i.e. ports 24, 24a being closed) and the loading mechanism is run into a pile of material in a direction such that the impact is effective in a direction to extend the rod of the bucket cylinder or cylinders 16, fluid pressure or oil trying to get out of the cylinder port 56 might get through the check valve mechanism 32a into passageway 48, but could not pass the check valve mechanism 32b, so that the oil cannot be lost from the rod side of the cylinder, and the piston side 59 of the cylinder will not cavitate.

If the loader is run into a pile of material such that the impact is in a direction causing compression of the rod of the bucket cylinder or cylinders, oil trying to escape from port 57 of the motor unit might get through check valve 32b upon causing it to move off of its seat, but would not be able to pass check valve 32a, so that such an impact compression load will be carried on the full piston area of the motor unit or units.

Figure 2:
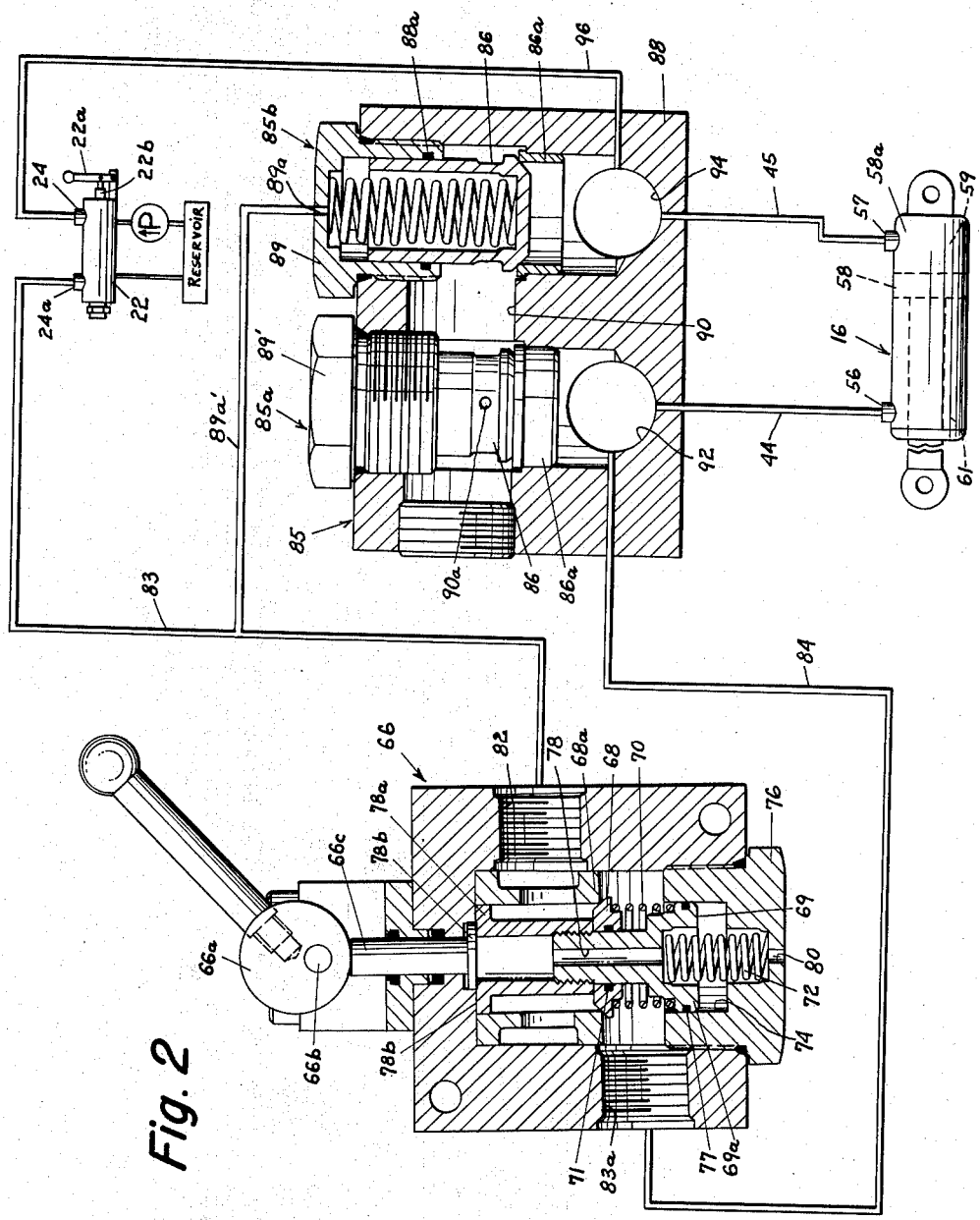
FIG. 2 is a generally diagrammatic, sectioned view of another embodiment of the system.

Referring now to FIG. 2, there is illustrated another fluid power system, which utilizes a hydraulic switch 66 adapted to be manually actuated by the operator, or which could, for instance, be indirectly actuated by a small remote control pilot valve accessible to the operator. In this arrangement, the switch valve 66 may comprise a manually operated eccentric portion 66a rotatable about pivot 66b, which upon movement thereof, forces a movable stem 66c downwardly, thereby moving the spring-loaded valve member 68 off of its seat 68a. As can be seen in FIG. 2, the valve member 68 is movable axially relative to a piston member 69, and is spring-loaded as by means of compression spring 70, coacting between head 69a of member 69 and valve member 68. Sealing means such as an O-ring 71 may coact between relatively movable members 69 and 68. Member 69 is also spring-loaded, as by means of compression spring 72, and is adapted for axial movement in the cylinder portion 74 of cap member 76. Sealing means, such as a resilient O-ring 77, may be provided on head portion 69a of member 69, and an opening 78 extending axially through member 69 communicates cylinder portion 74 with the interior of threaded head 78a, which is adapted for engagement as at 78b with the housing of switch 66 to limit upward axial movement of member 69. Cap 76 is vented as at 80.

Port 82 of the hydraulic switch 66 may be coupled as by means of fluid line 83 to port 24a of the distributing valve 22, and port 83a of the hydraulic switch may be coupled as by means of fluid distributing line 84 to quick dump control or regenerative valve member 85, which is of highly compact construction, and which may be conveniently located adjacent or closely adjacent to an associated motor unit 16. As illustrated, valve 85 may comprise a pair of check valve assemblies 85a, 85b, each including a spring-loaded valve plunger or member 86, adapted for seating engagement with associated valve seat member 86a, in the housing 88 of valve member 85. Sealing means 88a may be provided, and cap 89 of valve assembly 85b is vented as at 89a and connected by line 89a' back to line 83. Cap 89' of valve assembly 85a is not vented, and the plunger of valve assembly 85a is provided with an opening 90a through the wall thereof communicating the interior of the plunger with passageway 90 in housing 88. The valve member 86 of valve assembly 85b has no opening corresponding to opening 90a in valve assembly 85a. Passageway 90 connects the check valve assemblies 85a, 85b.

Port 56 of motor unit 16 is connected via fluid line 44 to port 92 of valve 85 which in turn is connected by aforementioned line 84 to the hydraulic switch 66. Port 57 of the motor unit 16 is connected to port 94 of valve 85 which in turn is connected via line 96 to port 24 of distributing valve 22.

Operation of this FIG. 2 system may be as follows: Assuming that it is desired to tip back a bucket 14, the control valve 22 will be actuated so that port 24a thereof is pressurized and port 24 is connected to the reservoir tank. Pressurized oil will then enter the hydraulic switch 66 via port 82, and will pass through check valve mechanism 68 by forcing the latter downwardly against the resistance to compression of spring 70. The fluid will then flow via port 83a and line 84 to port 92 of valve 85 and via line 44 to the rod side 61 of the motor unit 16. Oil from the piston side 59 of the motor unit 16 will be exhausted via port 57, line 45 and line 96 back to port 24 of the distributing valve 22, and thence to the reservoir.

The pressurized fluid or oil at port 92 of valve 85 will be able to open check valve mechanism 85a but cannot open check valve mechanism 85b. Therefore, such pressurized fluid cannot return to the reservoir and valve mechanism 85b will remain closed.

To accomplish normal dumping or downward pivoting of a bucket, the control valve 22 may be shifted to a position such that port 24 of the valve 22 is pressurized, and port 24a is connected to the reservoir. This will apply pressurized fluid to port 57 of the motor unit 16 via line 96, port 94 and line 45, driving the piston rod outwardly, while port 56 of the motor unit will be connected via the hydraulic switch 66 (if the latter is opened by movement of the eccentric thereof) to port 24a of the distributing valve and thus to the reservoir. Pressurized fluid entering port 94 on the way to the piston side 59 of the motor unit not only causes the piston rod to extend, but also causes check valve 86 of assembly 85b to move off of its associated seat 86a. However, since such fluid has no opening effect upon the valve plunger member 86 of the check valve assembly 85a, such fluid is not connected to the reservoir or tank. When the hydraulic switch eccentric 66a is moved in a direction so as to hold the valve member 68 of the check valve off its seat 68a due to downward movement of stem 66c against the resistance to compression of spring 72, fluid from the piston rod side 61 of the motor unit 16 will flow through the hydraulic switch back to port 24a of the distributing valve 22, and then to the reservoir.

Now to accomplish regenerative dumping, the switch mechanism 66 is not actuated, but the valve member 68 is maintained in closed position by its associated spring 70. Thus fluid from the piston rod side 61 of the motor unit 16 cannot pass through the hydraulic switch and back to the reservoir. However, upon outward movement of the piston rod due to application of pressurized fluid to port 57 of the motor unit, the fluid at port 56 of the motor unit passes into port 92 of valve 85 and moves the plunger valve member 86 of check valve assembly 85a off of its seat 86a, and since check valve assembly 85b is open due to the pressurized actuating fluid at port 94 of the valve 85, the fluid from the piston rod side 61 of the motor unit flows through passageway 90 and back out port 94 and through line 45 to the piston side of the motor unit 16, so that the pump in the system need supply only the rod displacement of the motor unit in a dumping operation.

This valve system has similar anti-cavitation characteristics as that of the first described system in that if the load starts to try to exceed the fluid input to the cylinder, the pressure at check valve mechanism 85b will fall, and thus the valve 86 will tend to close, restricting the exhaust from the piston rod side of the motor unit, so that the piston side 59 of the motor unit cannot be cavitated. Line 89a' communicating between line 83 and the interior of plunger 86 via vent 89a, insures that plunger 86 remains in closed or seated condition during retraction of the piston rod of motor unit 16 by actuation of valve 22.

If the loader is run into a pile of material in a direction such that the impact applies an extending force on the rod or rods of the bucket cylinder or cylinders, the oil trying to get out of the motor port 56 can get through the check 85a but cannot get through the hydraulic switch 66 (during regenerative dumping) so that oil cannot be lost from the rod side of the motor unit and the piston side of the motor unit will not cavitate. If the loader is run into a pile of material such that the impact applies a compression force on the motor unit, oil trying to escape from port 57 can open check 85b but not check 85a, so that the impact load will be carried on the full piston area of the cylinder and not just the area of the rod.

These systems incorporating a regenerative feature in accordance with the invention, minimize line losses and provide complete control of actuation of the motor unit or units by the machine operator.

The terms and expressions which have been used are used as terms of description, and not of limitation, and there is no intention in the use of such terms and expressions of excluding any equivalents of any of the features shown or described, or portions thereof, and it is recognized that there are various modifications possible within the scope of the invention claimed.

I claim:

1. In a control valve for use in a pressurized fluid power system for controlling the actuation of a fluid powered motor unit adapted to raise and lower a load comprising, a body, a plurality of biased check valve mechanisms mounted in said body, each of said valve mechanisms comprising a valve seat having inner and outer ends and a biased valve member adapted for sealing engagement with the inner end of said valve seat, a plurality of fluid passing ports in said body, each of said ports communicating with a respective one of said valve mechanisms and communicating said respective valve mechanism with the exterior of said body, each of said ports being in constant communication with the outer end of the respective valve seat in a direction away from the respective valve member, so that predetermined fluid pressure at the respective of said ports will be operative to actuate the respective valve member in a direction away from the inner end of its respective valve seat, and passageway means in said body communicating the inner ends of the valve seats of at least a pair of said valve mechanisms with one another.

2. A valve in accordance with claim 1, wherein said one pair of said check valve mechanisms are biased in the same direction, while another of said check valve mechanisms is biased in the opposite direction, and other passageway means in said body communicating the inner end of the valve seat of said other valve mechanism with the outer end of the valve seat of one of said pair of valve mechanisms.

3. A valve in accordance with claim 2, including adjustable means adapted for coaction with said other check valve mechanisms for varying the closing thereof.

4. A control valve for use in a pressurized fluid power system for providing a regenerative circuit for an associated reciprocal, double acting motor unit for raising and lowering a load comprising, a body, a passageway in said body, a port communicating the exterior of said body with said passageway, a biased check valve including a valve seat having inner and outer ends and an axially movable valve member adapted for sealing engagement with the inner end of said valve seat disposed in said passageway and normally operative to pass fluid through said passageway in only one direction, said port being in constant communication with the outer end of said valve seat, a second port in said body communicating with said passageway and the inner end of said valve seat and adapted for coupling to one end of the motor unit, said check valve being disposed intermediate said ports, second and third biased check valves disposed in said body, said second and third check valves each comprising a valve seat having inner and outer ends and an axially movable valve member adapted for sealing engagement with the inner end of the respective valve seat, passageway means in said body communicating the inner ends of the valve seats of said second and third check valves with one another, said second port communicating with the outer end of the valve seat of said second check valve, a third port in said body communicating with the outer end of the valve seat of said third check valve, said third port being adapted for coupling to the other end of the motor unit, and said second and third check valves being biased in the same direction while the first mentioned check valve is biased in the opposite direction.

5. A control valve for use in a pressurized fluid system for providing a regenerative circuit for an associated fluid powered motor unit adapted to raise and lower a load, said valve comprising a body, said body having a pair of cavities therein, a check valve mechanism disposed in each of said cavities, each of said valve mechanisms including a valve seat having inner and outer ends and an axially movable valve member adapted for sealing engagement with the inner end of said valve seat, a plurality of ports in said body communicating the exterior of said body with each of said cavities, each of said ports being in constant communication with the outer end of the respective valve seat in a direction away from the respective valve member, said ports being adapted for coupling to opposite ends of the motor unit, transverse passageway means connecting said cavities and being in constant communication with the inner ends of said valve seats, said check valve mechanisms being biased in the same direction and when in closed condition being operative to isolate said ports from one another.

6. In a fluid powered system for actuating a double acting fluid powered motor unit adapted to raise and lower a load comprising in combination, a distributing valve, a control valve, fluid transmission line means coupling said control valve to said distributing valve, means coupling said control valve to said motor unit, said control valve comprising a body, a plurality of biased check valve mechanisms mounted in said body, each of said valve mechanisms comprising a valve seat having inner and outer ends and a biased valve member adapted for sealing engagement with said inner end of said valve seat, a plurality of fluid ports in said body, each of said ports communicating with a respective one of said valve mechanisms and being in constant communication with the outer end of the respective valve seat in a direction away from the respective valve member, and passageway means in said body in constant communication with the inner ends of the valve seats of at least one pair of said valve mechanisms, said control valve being operative to return fluid being exhausted from said motor unit through said control valve and directly back to the motor unit upon actuation of said motor unit in a predetermined direction.

7. A fluid power system in accordance with claim 6, wherein said one pair of said check valve mechanisms are biased in the same direction, another of said check valve mechanisms being biased in the opposite direction, means in said body communicating the outer end of the valve seat of one of said pair of check valve mechanisms with the inner end of the valve seat of said other check valve mechanisms, said ports being operative to apply pressurized actuating fluid from said distributing valve to the other of said pair of check valve mechanisms, and operative to apply pressurized exhaust fluid from the motor unit to said one of said pair of check valve mechanisms for regenerating the pressurized exhaust fluid in the actuation of the motor unit when pressurized fluid is being applied to said other of said pair of check valve mechanisms.

8. In a fluid powered system comprising in combination a reciprocal double acting fluid powered motor unit adapted to raise and lower a load, a source of actuating fluid, a distributing valve coupled to said source, a control valve coupled to said distributing valve, and means coupling said control valve to opposite ends of said motor unit, said control valve comprising a valve body, a pair of ports in said valve body coupled to said means and to said distributing valve, a plurality of biased check valve mechanisms mounted in said body, said valve mechanisms being biased in the same direction, each of said valve mechanisms comprising a valve seat having inner and outer ends and a biased valve member adapted for sealing engagement with the inner end of said valve seat, each of said ports communicating with the outer end of the respective valve seat in a direction away from the respective valve member, and passageway means in said body communicating the inner ends of the valve seats of said valve mechanisms with one another for returning fluid exhausted from one end of the motor unit through said body and directly to the opposite end of the motor unit upon actuation of the motor unit in one predetermined direction.

9. A fluid power system in accordance with claim 8, including a fluid switch mechanism coupled to said distributing valve and to said control valve intermediate the latter valves.

10. A fluid power system in accordance with claim 9, including means for manually actuating said fluid switch.

11. A fluid power system comprising in combination, a reciprocal double acting, fluid powered motor unit adapted to raise and lower a load, a source of actuating fluid, a distributing valve coupled to said source, a control valve coupled to said distributing valve, and means coupling said control valve to said motor unit, said control valve comprising a body, a passageway in said body, a port in said body coupled to said distributing valve and communicating with said passageway, a biased check valve including a valve seat having inner and outer ends and a biased valve member adapted for sealing engagement with said inner end of said valve seat disposed in said passageway and normally operative to pass pressurized fluid therethrough in an inward direction only, a second port in said body communicating with said passageway and said inner end of said valve seat and coupled to the piston rod end of the motor unit, said check valve being disposed intermediate said ports, second and third biased check valves disposed in said body, said second and third check valves each including a valve seat having inner and outer ends and a biased valve member adapted for sealing engagement with the inner end of the respective valve seat, passageway means in said body communicating the inner ends of the valve seats of said second and third check valves with one another, said second port communicating with the outer end of the valve seat of said second check valve, a third port in said body communicating with the outer end of the valve seat of said third check valve, said third port being coupled both to said distributing valve and to the piston end of said motor unit, said second and third check valves being biased in the same direction while said first check valve is biased in the opposite direction, said second check valve being operative to pass exhaust fluid therethrough from said piston rod end of said motor unit to said piston end thereof upon application of pressurized fluid to said third port by said distributing valve.

12. A fluid power system comprising in combination, a reciprocal double acting, fluid powered motor unit, a source of actuating fluid, a distributing valve coupled to said source, a control valve coupled to said motor unit and to said distributing valve, and a second control valve disposed intermediate the first control valve and said distributing valve and coupled thereto, said second control valve being adapted in its normal operating condition to pass fluid only in a direction from said distributing valve to the first control valve, means for actuating said second control valve to permit passage of fluid therethrough in a direction from said first control valve to said distributing valve, and said first control valve including means for returning fluid being exhausted from one end of the motor unit through said first control valve and directly to the opposite end of the motor unit upon actuation of the motor unit in a predetermined direction by said distributing valve.

13. A system in accordance with claim 11 wherein said valve member of said third check valve has means communicating the same with the fluid pressure at the first mentioned port.

14. A system in accordance with claim 13 wherein said valve members are hollow and reciprocate in associated cap members defining cylinder portions, said valve member of said second check valve having an opening therethrough communicating the interior of the last mentioned member with said passageway means communicating said second and third check valves, the interior of the valve member of the third check valve being isolated from the last mentioned passageway means.

References Cited by the Examiner
UNITED STATES PATENTS 863,701   3/1961   Caterpillar _____ 91—436

SAMUEL LEVINE, *Primary Examiner.*

FRED E. ENGELTHALER, *Examiner.*